US012795034B2

(12) United States Patent
Hashimoto

(10) Patent No.: US 12,795,034 B2
(45) Date of Patent: Nov. 10, 2026

(54) IMAGE FORMING DEVICE AND IMAGE FORMING METHOD

(71) Applicant: Toshiba Tec Kabushiki Kaisha, Tokyo (JP)

(72) Inventor: Yoshitaka Hashimoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 18/664,625

(22) Filed: May 15, 2024

(65) Prior Publication Data

US 2025/0193331 A1 Jun. 12, 2025

(30) Foreign Application Priority Data

Dec. 12, 2023 (JP) ................................ 2023-209492

(51) Int. Cl.
*H04N 1/393* (2006.01)
*G06F 3/12* (2006.01)

(52) U.S. Cl.
CPC ........... *H04N 1/393* (2013.01); *G06F 3/1205* (2013.01); *G06F 3/1242* (2013.01)

(58) Field of Classification Search
CPC ...... H04N 1/393; G06F 3/1205; G06F 3/1242
See application file for complete search history.

(56) References Cited

U.S. PATENT DOCUMENTS 10,901,663 B2 1/2021 Hori
11,973,918 B2 * 4/2024 Yano .................... H04N 1/6036
2007/0177212 A1 8/2007 Uchida
2015/0002565 A1 1/2015 Maeda
2019/0126651 A1 * 5/2019 Terakado ................ B41J 29/38

FOREIGN PATENT DOCUMENTS

JP 2005-078128 A 3/2005
JP 2009-093247 A 4/2009
JP 2023-074799 A 5/2023
JP 2023-107074 A 8/2023
WO WO-2006/126481 A1 11/2006

OTHER PUBLICATIONS

NPL: InnovationQ+ by IP.com and IEEE: Results Publication Date Range: Jun. 2, 1999 to Dec. 5, 2025.*
NPL: InnovationQ+ by IP.com and IEEE, Results Publication Date Range: Dec. 20, 2001 to Apr. 15, 2026.*
Extended European Search Report dated Nov. 4, 2024 issued in EP Application No. 24181928.3, 9 pages.
Notice of Reasons for Refusal dated Jul. 6, 2026 issued in JP Application No. 2023-209492, with English translation, 6 pages.

* cited by examiner

*Primary Examiner* — Quang N Vo
(74) *Attorney, Agent, or Firm* — FOLEY & LARDNER LLP

(57) ABSTRACT

An image forming device is configured to form image data on a medium. The image forming device includes an acquirer configured to acquire setting information including width information indicating a printable range in which the image data is formable in a width direction of the medium, and length information indicating a printable length range in which the image data is formable in a length direction of the medium, wherein the acquirer is configured to switch a formation position of the image data based on the length information corresponding to a type of the medium, and a former configured to form an image on the medium based on the setting information acquired by the acquirer.

17 Claims, 5 Drawing Sheets

1

IMAGE FORMING DEVICE AND IMAGE FORMING METHOD

CROSS-REFERENCE TO RELATED APPLICATION

This application is based upon and claims the benefit of priority from Japanese Patent Application No. 2023-209492, filed on Dec. 12, 2023, the entire contents of which are incorporated herein by reference.

FIELD

Embodiments described herein relate to an image forming device and an image forming method for forming image data on a medium.

BACKGROUND

In the related art, in enlarged printing or reduced printing of image data, such as PDF, using this type of image forming device, printing is performed to match the size of the image data to a set output paper, for example, A3 or A4, for which the size in a width direction (e.g., a transverse direction) and the size in a longitudinal direction orthogonal to the width direction are set in advance.

Since image forming devices are not designed to be able to easily perform appropriate image formation for a wide variety of output paper types, there is a case where a user is forced to determine detailed print settings, such as considering margins as appropriate, depending on a type of the output paper.

DETAILED DESCRIPTION

Figure 1:
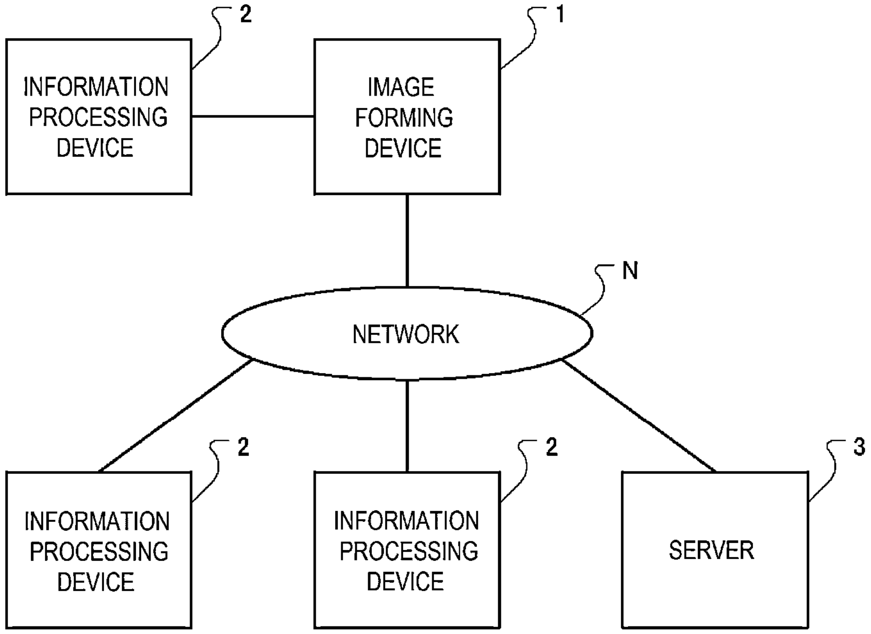
FIG. 1 is a diagram schematically illustrating an image forming system according to one embodiment.

In general, according to one embodiment, a technique capable of facilitating appropriate image formation for a wide variety of output paper types is provided.

According to one embodiment, an image forming device that forms image data on a sheet-shaped medium includes: an acquisition unit configured to acquire setting information including width information indicating a printable range in which the image data is formable in a width direction of the medium and length information for switching a formation position of the image data in a length direction orthogonal to the width direction according to a type of the medium; and a forming unit configured to form an image on the medium based on the setting information acquired by the acquisition unit.

Hereinafter, an embodiment will be described with reference to the drawings. In the drawings, the same components are denoted by the same reference numerals.

Configuration of Image Forming System

A configuration of an image forming system according to an embodiment will be described. FIG. 1 is a diagram schematically illustrating an image forming system according to the embodiment.

As illustrated in FIG. 1, the image forming system according to the embodiment includes an image forming device (e.g., an image forming apparatus, an image former, etc.) 1, a plurality of information processing devices (e.g., processors, etc.) 2, and a server 3.

The image forming device 1 forms acquired image data generated in a format such as PDF or JPEG on an output paper (e.g., a medium, an output medium, etc.). Examples of the image forming device 1 include a printer that forms an image on an output paper by an electrophotographic method, an ink jet method, a thermal transfer method, or the like, and a multifunction peripheral (MFP). In the embodiment, the image forming device 1 is a barcode printer which is used as an in-line printer installed in a workplace or the like and can form a two-dimensional barcode or the like as image data on an output paper. Accordingly, the image forming device 1 can use, as the output paper, a roll-shaped label sheet attached with a plurality of labels with no image to be printed formed thereon, or a label sheet used for a receipt, a ticket, or the like where an entire upper surface is a surface to be printed.

The image forming device 1 according to the embodiment is connected to the information processing devices 2 and the server 3 for data communication via a network N such as the Internet or an intranet. The information processing devices 2 and the server 3 transmit, to the image forming device 1, print setting information (e.g., setting information, etc.) related to printing of image data input by a user together with the image data. The image forming device 1 forms an image on a label sheet based on the transmitted image data and print setting information. The information processing device 2 is, for example, a desktop personal computer (PC), smartphone or a tablet terminal such as a laptop computer. The information processing device 2 may access the server 3 and then transmit the image data and the print setting information to the image forming device 1 via the server 3. The server 3 may be constructed as a cloud server.

The image forming device 1 may be connected to the information processing device 2 via a wired or wireless communication method. Examples of the wired communication method include Ethernet (registered trademark), USB, IEEE 1394 [FIREWIRE (registered trademark)], and LIGHTNING (registered trademark). Examples of the wireless communication method include short-range wireless communication such as near field communication (NFC) and Bluetooth (registered trademark), cellular, and Wi-Fi.

Hardware Configuration

Figure 2:
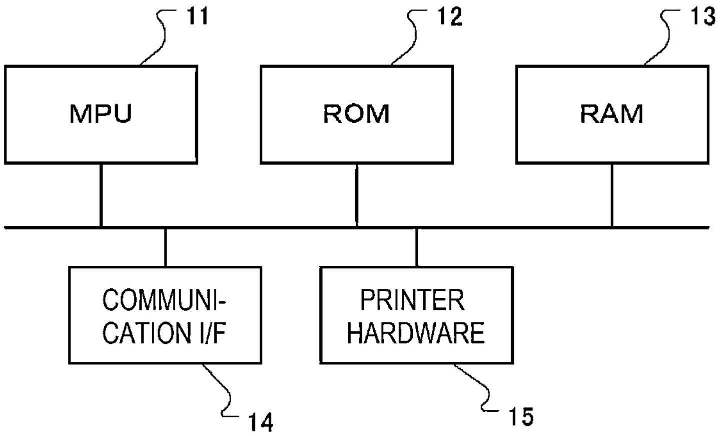
FIG. 2 is a block diagram illustrating a hardware configuration of an image forming device according to one embodiment.
Figure 3:
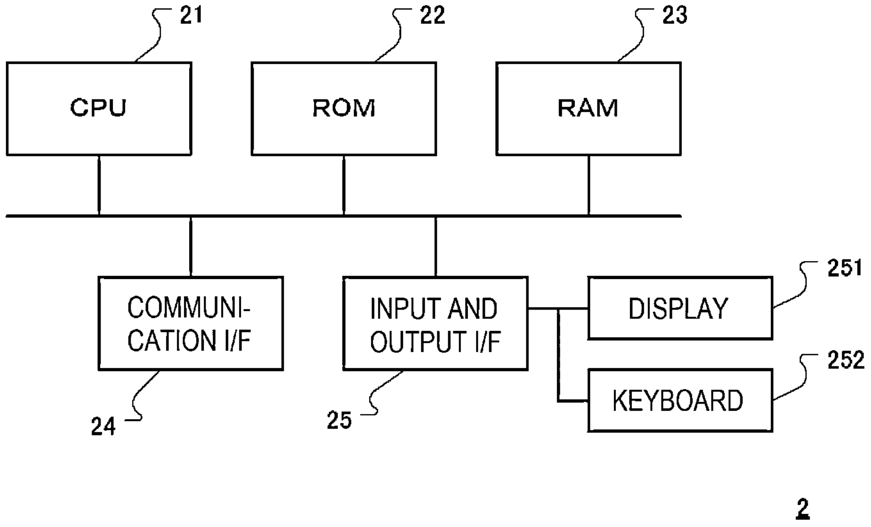
FIG. 3 is a block diagram illustrating a hardware configuration of an information processing device according to one embodiment.

Next, hardware configurations of the image forming device 1 and the information processing device 2 will be described. FIG. 2 is a block diagram illustrating a hardware configuration of the image forming device 1 according to the embodiment. FIG. 3 is a block diagram illustrating a hardware configuration of the information processing device 2 according to the embodiment.

As illustrated in FIG. 2, the image forming device 1 includes a micro processing unit (MPU) 11, a read only memory (ROM) 12, a random access memory (RAM) 13, a communication interface (I/F) 14, and printer hardware 15.

The MPU 11 executes various programs such as a basic input/output system (BIOS), an operating system (OS), and a general-purpose application read from the ROM 12, which is a nonvolatile storage area, and a program for executing an image forming process (e.g., an image forming method, etc.) to be described later, by loading the programs on the RAM 13, which is a volatile storage area. The ROM 12 also stores various data used in the image forming process, for example, definition data of first to fourth setting printing described later. In the embodiment, the MPU 11 and the RAM 13 cooperate to execute the image forming process described later. The communication I/F 14 is used for communication with the information processing device 2 and the server 3.

The printer hardware 15 is hardware that prints on a label sheet. For example, for a printer that only sequentially feeds out labels, the printer hardware 15 includes a ribbon winding motor that winds an ink ribbon, a platen motor that drives a platen roller, a supply and discharge motor that supplies and discharges a label sheet, a print head having a heating element, and the like. In addition, for example, for a printer that cuts a label in sheets, a cutter unit (e.g., a cutter, a cutter device, etc.) or the like that cuts a label sheet is further provided. The printer hardware 15 is controlled by the MPU 11.

As illustrated in FIG. 3, the information processing device 2 includes a central processing unit (CPU) 21, a ROM 22, a RAM 23, a communication I/F 24, and an input and output I/F 25.

The CPU 21 executes various programs such as a BIOS, an OS, and a general-purpose application read from the ROM 22, which is a nonvolatile storage area, and a program for executing the image forming process to be described later, by loading the programs on the RAM 23, which is a volatile storage area. The ROM 22 also stores various data used in the image forming process, for example, data of an input screen of print setting information. In the embodiment, the CPU 21 and the RAM 23 cooperate to execute the image forming process described later. The communication I/F 24 is used for communication with the image forming device 1 and the server 3. The input and output I/F 25 is used to connect a display 251, a keyboard 252, and other input and output devices such as a mouse to the information processing device 2.

Since the server 3 can have substantially the same hardware configuration as the information processing device 2 in a broad sense, a detailed description of the hardware configuration is omitted here.

Functional Configuration

Figure 4:
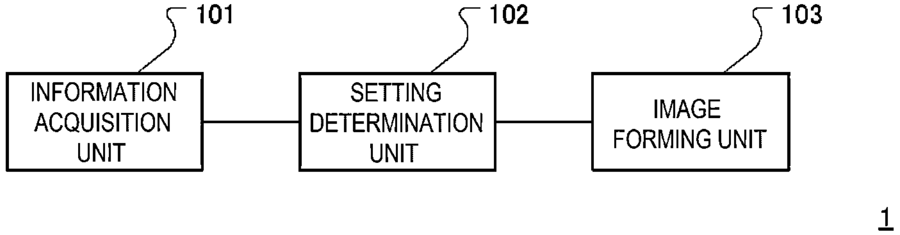
FIG. 4 is a block diagram illustrating a functional configuration of the image forming device according to one embodiment.
Figure 5:
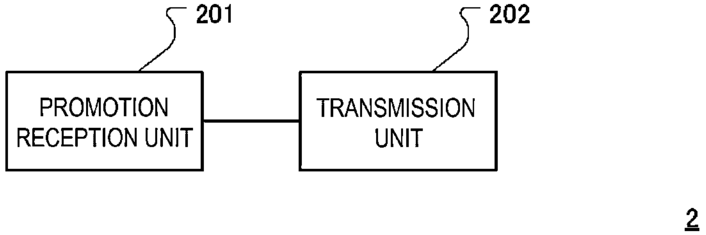
FIG. 5 is a block diagram illustrating a functional configuration of the information processing device according to one embodiment.

Next, functional configurations of the image forming device 1 and the information processing device 2 will be described. FIG. 4 is a block diagram illustrating the functional configuration of the image forming device according to the embodiment. FIG. 5 is a block diagram illustrating the functional configuration of the information processing device according to the embodiment.

As illustrated in FIG. 4, the image forming device 1 includes an information acquisition unit 101, a setting determination unit 102, and an image forming unit (e.g., an image former, etc.) 103 as functions. These functions are achieved by cooperation of the hardware of the image forming device 1 described above. The information acquisition unit 101 acquires image data and print setting information transmitted from the information processing device 2. The setting determination unit 102 determines which of the first to fourth setting printing is to be performed based on the acquired print setting information. Details of the first to fourth setting printing will be described later. The image forming unit 103 forms the image data on the label using any one of the first to fourth setting printing methods described later based on the acquired image data and the print setting information.

As illustrated in FIG. 5, the information processing device 2 includes a promotion reception unit (e.g., a promotion receptor, a promotion receiver, etc.) 201 and a transmission unit (e.g., a transmitter, etc.) 202 as functions. These functions are achieved by cooperation of the hardware of the information processing device 2 described above. The promotion reception unit 201 displays a print setting screen, which is an input screen of print setting information, on the display 251, and receives an input from the user. The transmission unit 202 transmits the input print setting information and the image data that the user wants to print out to the image forming device 1.

Image Forming Process

Figure 6:
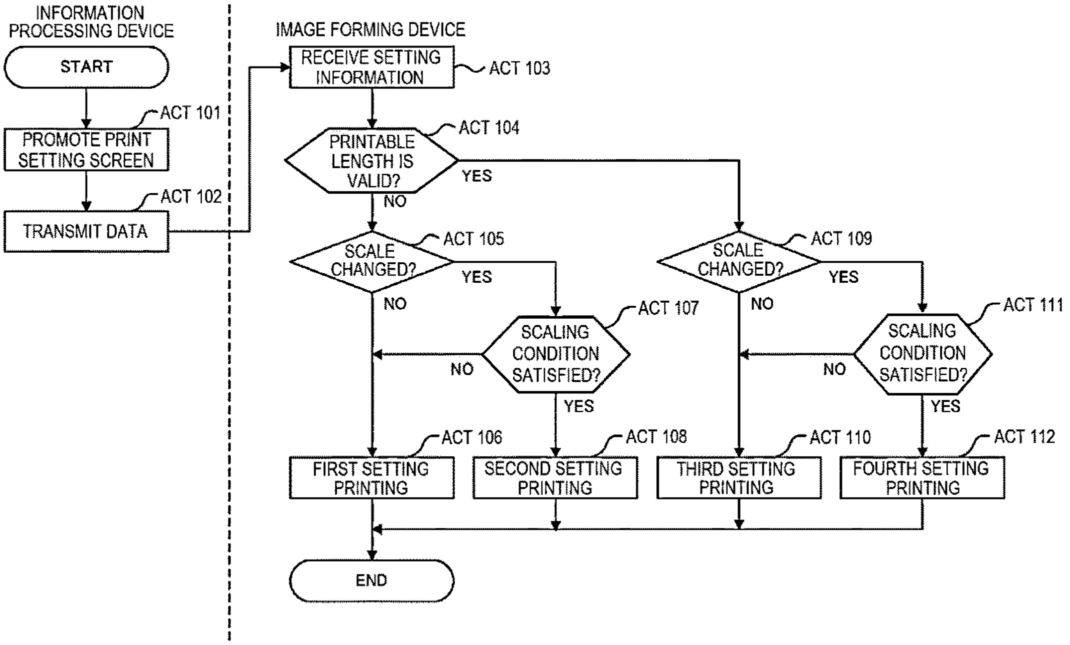
FIG. 6 is a flowchart illustrating an image forming process according to one embodiment.

Next, the image forming process by the image forming system will be described in detail. FIG. 6 is a flowchart showing the image forming process (e.g., image forming method, etc.) according to the embodiment. The image forming process according to the embodiment is executed when, for example, the user selects a print button on a display screen of desired image data in order to print the image data in the information processing device 2 as a trigger.

Figure 7:
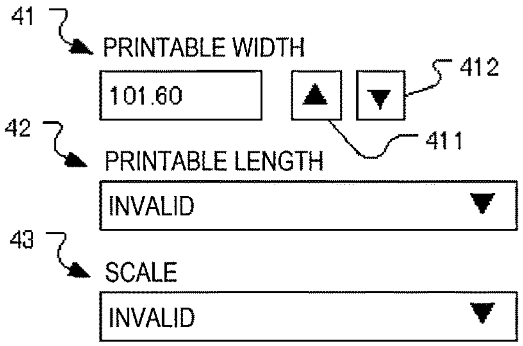
FIG. 7 is a diagram illustrating a print setting screen in an initial state displayed in the information processing device.
Figure 8:
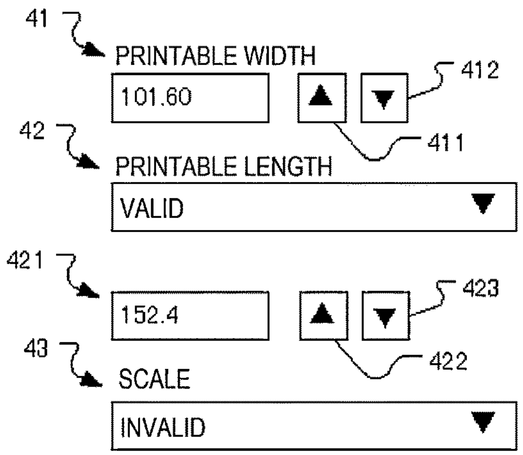
FIG. 8 is a diagram illustrating the print setting screen in a state where a printable length is valid.
Figure 9:
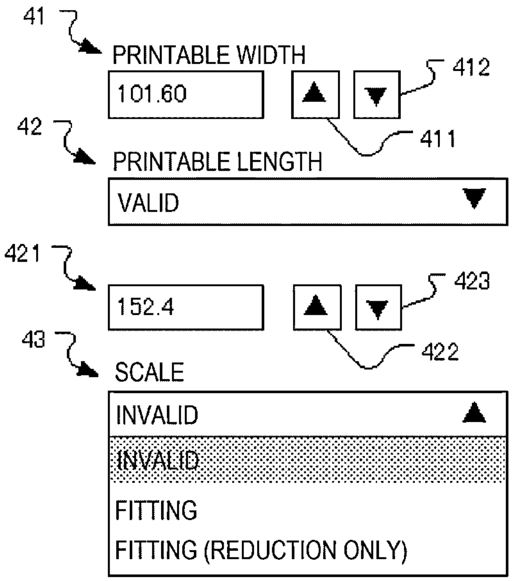
FIG. 9 is a diagram illustrating the print setting screen in a state where the printable length is valid and options for scale is displayed.

First, the promotion reception unit 201 of the information processing device 2 promotes (e.g., displays, provides, etc.) a print setting screen on the display 251, prompts the user to input (e.g., input information, input a setting, etc.), and acquires the following pieces of input information (Act 101). FIGS. 7 to 9 are diagrams illustrating print setting screens in an initial state, a state where a printable length is valid, and a state where the printable length is valid and options for scale (e.g., scaling information, etc.) is displayed, which are displayed in the information processing device 2 according to the embodiment. As shown in FIG. 7, in the initial state, three items of an input field 41 for inputting a printable width (e.g., width information, etc.), a selection field 42 for selecting validity/invalidity of a printable length (e.g., length information, etc.), and a selection field 43 for selecting scale are displayed on the print setting screen.

The printable width indicates a width (e.g., a length in a sheet transverse direction, etc.) of a printable range in a label sheet set in the image forming device 1. Specifically, when the output paper is a label sheet in which a plurality of labels are attached and arranged along a sheet longitudinal direction at regular intervals, the printable width indicates a width of each label. Hereinafter, such a label sheet is referred to as an intermittent label sheet. On the other hand, when the output paper is a label sheet whose entire upper surface is a surface to be printed, the printable width indicates a sheet width of the label sheet. Hereinafter, such a label sheet is referred to as a continuous label sheet. In the input field 41, a numerical value of a general printable width is set in advance as a default value. In FIGS. 7 to 9, 101.60 mm is set. An increase button 411 and a decrease button 412 are provided in the vicinity of the input field 41, and by pressing (e.g., selecting, clicking, etc.) these buttons or by directly inputting a numerical value in the input field 41, a value of the printable width can be changed as appropriate.

The printable length indicates a length in a printable range of the label sheet in a direction orthogonal to the width direction (e.g., a sheet longitudinal direction: appropriately referred to as a length direction, etc.), and can be switched between valid (e.g., fixed, preset, default, etc.) and invalid (e.g., variable, changing, customizable, etc.) in the embodiment. The term valid indicates that the printable length is a fixed value. On the other hand, invalid indicates that the printable length is a variable value. Specifically, when individual labels of a fixed size are arranged in the sheet longitudinal direction as in the intermittent label sheet, the printable length is preferably valid. By setting the printable length as valid, it is determined that a length of each label in the sheet longitudinal direction, that is, the printable length is a predetermined fixed value, and image data is printed with reference to a position of a substantially center value of the fixed value, in other words, a center position of the printable length. Therefore, the fixed value can also be said to be a value indicating a predetermined printable range in which the image data can be formed. As shown in FIG. 8, when the printable length is selected to be valid in the selection field 42, a fixed value input field 421 in which the fixed value can be appropriately changed is promoted (e.g., displayed, shown, etc.). Specifically, the fixed value can be changed by pressing an increase button 422 and a decrease button 423 in the vicinity of the fixed value input field 421 or by directly inputting a numerical value in the fixed value input field 421. In FIGS. 8 and 9, 152.40 mm is set as the fixed value.

On the other hand, when there is no distinction between individual labels as in the continuous label sheet, the printable length is preferably invalid. By setting the printable length as invalid, when the image data is continuously printed, it is possible to print the image data in the sheet longitudinal direction, that is, in close proximity to each other. It is preferable that the proximity interval can be changed. From the above, it can be said that the printable length is used to switch a formation position of the image data in the length direction according to the type of the label sheet.

The scale indicates whether to enlarge or reduce the size of the image data for printing. In the embodiment, three options of invalid, fitting, and fitting (e.g., reduction only) are set to be switchable (e.g., changeable, selectable, etc.). The invalid option indicates that printing is performed without enlarging or reducing the size of the image data. The fitting option indicates that the size of the image data is enlarged or reduced. When the printable length is invalid, a reference for the enlargement and reduction is made based on an original size and the printable width of the image data. That is, when the original size exceeds the printable width, the image data is reduced based on the printable width, and when the original size is less than the printable width, the image data is enlarged based on the printable width. On the other hand, when the printable length is valid, the enlargement and reduction are performed with one of the printable width and the printable length set as a reference while maintaining the aspect ratio of the image data. At this time, when the image data is enlarged or reduced based on one of the values, the image data may not fit within the other value. In such a case, the other value becomes the reference. To explain with an example, when the printable length is set as the reference and enlarging the image data based on the printable length, if a width of the image data exceeds the printable width, the enlargement is performed based on the printable width. The original size here means, for example, an actual size set for data such as a PDF document. Fitting (e.g., reduction only, reducing, etc.) indicates that the image data is reduced. When the original size exceeds the printable width, the image data is reduced based on the printable width, and when the original size is less than the printable width, the original size is maintained. Fitting (e.g., reduction only, etc.) is preferably selected when handling, for example, image data whose content may be missing due to the enlargement, or image data such as a barcode having a possibility of losing a function due to deviation from a reading range of a reader when the image data is enlarged.

By the combination of these settings, various types of printing, in the embodiment, the first setting printing to the fourth setting printing described below can be performed.

Referring back to FIG. 6, after the promotion (e.g., display, showing, etc.) of the print setting screen, the transmission unit 202 transmits the print setting information including information of the printable width, the printable length, the scale, and in some cases, the fixed value input and selected by the user to the image forming device 1 together with the image data to be printed (Act 102). The transmitted image data also includes information on the size thereof.

After the transmission, the information acquisition unit 101 of the image forming device 1 acquires the image data and the print setting information transmitted from the information processing device 2 (Act 103). After the acquisition, the setting determination unit (e.g., setting determiner, etc.) 102 determines whether the setting of the printable length included in the print setting information is valid (Act 104). When it is determined that the setting of the printable length is not valid (Act 104, NO), the setting determination unit 102 determines whether to change the scale of the image data, that is, to enlarge or reduce the image data based on the print setting information (Act 105). In this determination, when the setting of the scale included in the print setting information is fitting or fitting (e.g., reduction only), it is determined to change the scale, and when the setting of the scale is invalid, it is determined not to change the scale.

When it is determined not to change the scale of the image data (Act 105, NO), the image forming unit 103 performs the first setting printing to print the image data of the original size based on the print setting information and the original size of the image data (Act 106), and the image forming process ends. When a plurality of print copies of the image data are set, the first setting printing is performed for the number of copies. The same applies to the second to fourth setting printing described later.

On the other hand, when it is determined to change the scale of the image data (Act 105, YES), the setting determination unit 102 determines whether a predetermined scaling condition is satisfied based on the print setting information and the information on the size of the image data (Act 107). In the embodiment, when the printable length is invalid, the scaling conditions are other than "the setting of the scale included in the print setting information is fitting (reduction only), and a length in the width direction of the original size of the image data is smaller than the printable width". On the other hand, when the printable length is valid, in addition to these conditions, "a length in the longitudinal direction of the original size of the image data is smaller than the printable length" is further added. When it is determined that the predetermined scaling condition is not satisfied (Act 107, NO), the first setting printing in Act 106 is executed. This means that the predetermined scaling condition is not satisfied when the length in the width direction of the original size of the image data is smaller than the printable width although the fitting (only reduction) is set in the print setting information. Therefore, since the image data may be enlarged, the first setting printing is performed when it is determined that there is no scale change.

On the other hand, when it is determined that the predetermined scaling condition is satisfied (Act 107, YES), the image forming unit 103 performs the second setting printing of scaling and printing the image data based on the print setting information and the original size of the image data, and the image forming processing ends.

When it is determined in Act 104 that the setting of the printable length is valid (Act 104, YES), the setting determination unit 102 determines whether to change the scale of the image data based on the print setting information (Act 109), as in Act 105. When it is determined not to change the scale of the image data (Act 109, NO), the image forming unit 103 performs the third setting printing to print the image data of the original size based on the print setting information and the original size of the image data (Act 110), and the image forming process ends.

On the other hand, when it is determined to change the scale of the image data (Act 109, YES), the setting determination unit 102 determines whether the scaling condition is satisfied based on the print setting information and the information on the size of the image data (Act 111). When it is determined that the predetermined scaling condition is not satisfied (Act 111, NO), the third setting printing in Act 110 is executed.

On the other hand, when it is determined that the predetermined scaling condition is satisfied (Act 111, YES), the image forming unit 103 performs the fourth setting printing of scaling and printing the image data based on the print setting information and the original size of the image data (Act 112), and the image forming processing ends.

The first to fourth setting printing will be described in detail together with printing results. FIGS. 10 to 13 are diagrams illustrating the first setting printing, the second setting printing, the third setting printing, and the fourth setting printing according to the embodiment, respectively. In each drawing, (a) illustrates the image data of the original size, and (b) illustrates a print result (e.g., reducing, fitting, etc.) of the image based on the print setting. In each drawing, symbol S denotes a label sheet, D denotes image data, and E denotes an output image output based on the image data D.

Figure 10A:
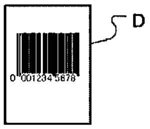
FIG. 10A is a diagram illustrating a first print setting of image data of original size.
Figure 10B:
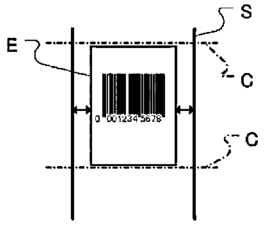
FIG. 10B is a diagram illustrating the first print setting of image data of a print result.

In the first setting printing, the image data is printed without changing the scale while the original size is applied in the sheet longitudinal direction and a substantially central position in the width direction is positioned at a substantially central position of the printable width. Therefore, the image data D illustrated in (a) of FIG. 10 is printed without size change as the output image E as illustrated in (b) of FIG. 10. Further, as illustrated in (b) of FIG. 10, substantially the same interval is defined on the left and right in the sheet transverse direction. Therefore, in the first setting printing, the image data D can be printed in the original size, and the substantial center of the image data D in the sheet transverse direction can be positioned at the substantial center of the label sheet S in the sheet transverse direction.

An imaginary line indicated by a dashed-dotted line with a symbol C indicates both ends of the label in the sheet longitudinal direction, and serves as a cutting line to be cut with a cutter (e.g., a cutting device, a blade, etc.) or the like. In the first setting printing, the image data D can be printed closer to a discharge side leading end in the longitudinal direction of the label sheet S, in other words, closer to the cutting line C. Therefore, it is possible to prevent the label sheet S from being excessively cut, that is, it is possible to prevent the label formed by cutting from including an excessive margin, and the label sheet can be used effectively, and costs can be reduced. Such a printing method is particularly useful in a label printer using a continuous label sheet.

The MPU 11 may determine a cutting position (e.g., a cutting line C, etc.) based on the print setting information. For example, the MPU 11 calculates the cutting position based on a length in the sheet longitudinal direction of the image data D of the original size or a scaled size, and automatically cuts the label sheet S using a cutter.

Figure 11A:
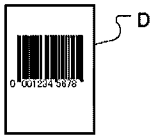
FIG. 11A is a diagram illustrating second print setting of image data of original size.
Figure 11B:
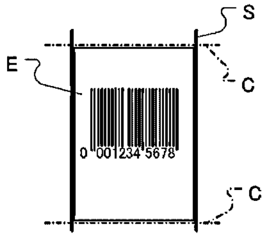
FIG. 11B is a diagram illustrating the second print setting of image data of a print result.

In the second setting printing, the image data is scaled according to the printable width, and therefore, the image data is printed such that the size of the image data in the sheet longitudinal direction is set to a length scaled according to the printable width. Accordingly, the image data D illustrated in (a) of FIG. 11 is scaled while maintaining the aspect ratio and printed as the output image E as illustrated in (b) of FIG. 11. As illustrated in (b) of FIG. 11, in terms of label handling, it is preferable for the image data D to be scaled to such an extent that substantially the same slight interval is defined on the left and right in the sheet transverse direction. Further, (b) of FIG. 11 illustrates an example in which the image data D illustrated in (a) of FIG. 11 is enlarged. When the image data D is reduced, for example, even when the image data D illustrated in (a) of FIG. 11 is larger than the label sheet S, the image data D is reduced to a good state (e.g., a state fitting the label, a desired state, a desired size, etc.) as illustrated in (b) of FIG. 11.

As a result, in the second setting printing, the image data D can be scaled and printed, and the label sheet can be used effectively, and costs can be reduced. Such a printing method is particularly useful in a label printer using a continuous label sheet.

Figure 12A:
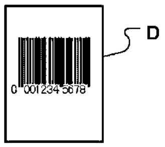
FIG. 12A is a diagram illustrating third setting of image data of original size.
Figure 12B:
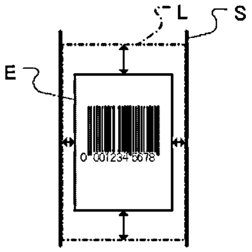
FIG. 12B is a diagram illustrating the third print setting of image data of a print result.

In the third setting printing, the image data is printed without changing the scale while a substantially central position in the sheet longitudinal direction is positioned at a substantially central position of the printable length (fixed value), and similarly, a substantially central position in the width direction is positioned at a substantially central position of the printable width. In other words, the image data is centered on the printable length and the printable width, and the center thereof is positioned at the center of the label. In (b) of FIG. 12, L indicated by dashed-dotted line indicates a label on the label sheet S. Therefore, the image data D illustrated in (a) of FIG. 12 is printed without size change as the output image E as illustrated in (b) of FIG. 12. Further, in the third setting printing, as illustrated in (b) of FIG. 12, substantially the same interval is defined between an edge portion of the label L and the image data D in the sheet longitudinal direction and the transverse direction.

Therefore, in the third setting printing, the image data D can be printed in the original size, and the image data D can be positioned substantially at the center of the label sheet S. Such a printing method is particularly useful in a label printer using an intermittent label sheet, a printer or a multifunction peripheral using a paper medium such as A4 or A3 as an output paper.

Figure 13A:
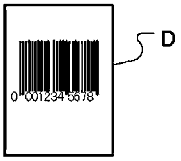
FIG. 13A is a diagram illustrating fourth setting of image data of original size.
Figure 13B:
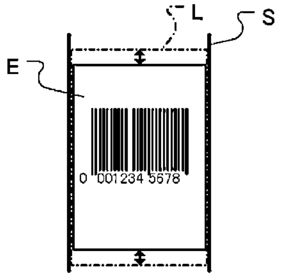
FIG. 13B is a diagram illustrating the fourth print setting of image data of a print result.

In the fourth setting printing, the image data is scaled according to the printable width, and therefore, the image data is printed such that the size of the image data in the sheet longitudinal direction is set to a length scaled according to the printable width. Accordingly, the image data D illustrated in (a) of FIG. 13 is scaled while maintaining the aspect ratio and printed as the output image E as illustrated in (b) of FIG. 13. As a result, an interval between the image data D and the edge portion of the label L is reduced compared to the third setting printing. As illustrated in (b) of FIG. 13, in terms of label handling, it is preferable for the image data D to be scaled to such an extent that substantially the same slight interval is defined on the left and right in the sheet transverse direction. Further, (b) of FIG. 13 illustrates an example in which the image data D illustrated in (a) of FIG. 13 is enlarged. When the image data D is reduced, for example, even when the image data D illustrated in (a) of FIG. 13 is larger than the label sheet S, the image data D is reduced to a good state as illustrated in (b) of FIG. 13.

Therefore, in the fourth setting printing, the image data D can be scaled and printed, and the image data D can be positioned substantially at the center of the label sheet S. Such a printing method is particularly useful in a label printer using an intermittent label sheet, a printer or a multifunction peripheral using a paper medium such as A4 or A3 as an output paper.

Figure 14A:
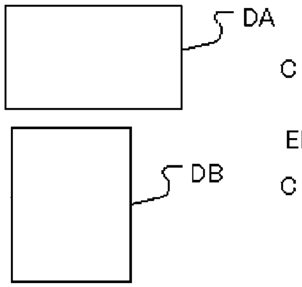
FIG. 14A is a diagram illustrating formation of different image data for two types of label sheets according to an application example.
Figure 14B:
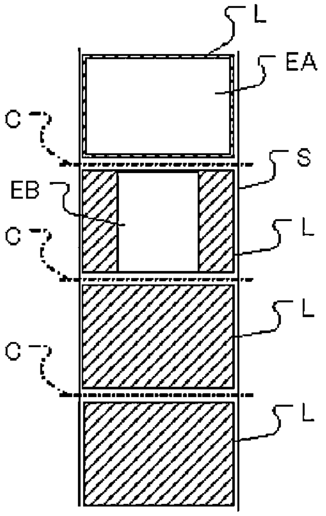
FIG. 14B is a diagram illustrating formation of different image data for a type of label sheet according to an application example.
Figure 14C:
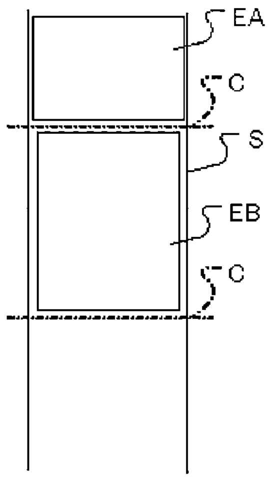
FIG. 14C is a diagram illustrating formation of different image data for a type of label sheet according to another application example.

In the image forming process described above, only one type of image data D is printed. Alternatively, a plurality of types of image data may be printed in succession. FIGS. 14A-14C are diagrams illustrating formation of different image data for two types of label sheets according to an application example of the embodiment. In FIGS. 14A-14C, DA and DB indicate image data, EA indicates an output image output based on the image data DA, and EB indicates an output image output based on the image data DB. When it is desired to continuously print the horizontally long image data DA and the vertically long image data DB as shown in (a) of FIG. 14 (e.g., FIG. 14A) by setting the scale to fitting in the print setting information, print results vary greatly depending on whether the printable length is valid or invalid. Specifically, when the printable length is set to be valid, as illustrated as the output images EA and EB in (b) of FIG. 14 (e.g., FIG. 14B), the image data DA and DB are uniformly reduced with respect to the label L, and in particular, the image data DB has an extremely large margin with the label L in the sheet transverse direction. On the other hand, when the printable length is set to be invalid, as illustrated as the output images EA and EB in (c) of FIG. 14 (e.g., FIG. 14C), the image data DA is reduced while the image data DB is enlarged, and the margins in both the sheet longitudinal direction and transverse direction can be extremely reduced.

According to the embodiment described above, by simply acquiring the print setting information appropriately input or selected by the user, it is possible to appropriately form the image data on the output paper according to the type of the output paper, for example, to reduce the margin or to enlarge or reduce the size. In particular, in addition to being able to scale the image data according to the printable width, the printable length can be switched between valid and invalid, that is, between a fixed length and a variable length. Therefore, the length in the sheet longitudinal direction can be changed appropriately, and the switching is also extremely easy.

In the embodiment, the image forming process (image forming method) is described as being executed by the image forming device 1 and the information processing device 2, but the disclosure is not limited thereto. The image forming process may be executed by the image forming device 1 and the server 3, and in this case, the server 3 may have various functions of the information processing device 2. It should be understood that the information processing device according to the embodiment includes not only the information processing device 2 but also the server 3.

In the embodiment, it is described that the information acquisition unit 101 of the image forming device 1 acquires the print setting information together with the image data from the transmission unit 202 of the information processing device 2. However, the print setting information may be stored in advance in the ROM 12 of the image forming device 1 or a database (not shown) of the image forming device 1 or the server 3. Therefore, the image forming device 1 may acquire simply the image data from the transmission unit 202 by the information acquisition unit 101 in Act 103 of FIG. 6, acquire the print setting information from the ROM 12 or the database by automatically reading, and perform the subsequent determination process of Act 104. Further, when the information acquisition unit 101 acquires the print setting information together with the image data from the transmission unit 202, the print setting information stored in advance may be updated.

In the above embodiment, programs (such as an image forming program) for implementing various functions of the image forming device 1, the information processing device 2, and the server 3 are installed in the image forming device 1, the information processing device 2, and the server 3 in advance. However, the program may be provided as an installable or executable file recorded on a computer-readable storage medium. Here, the storage medium includes all media that can be read and executed by a computer as the image forming device 1 or the information processing device 2 described above, such as media that can be attached to and detached from a control device 7, for example, a magnetic tape, a magnetic disk (hard disk drive or the like), an optical disk (CD-ROM, DVD disk or the like), a magneto-optical disk (MO or the like), and a flash memory, and media that can be transmitted via a network. Examples of the media that can be transmitted via a network include a medium stored on a computer such as an external server connected to the network N such as the Internet, and the medium is provided via the network N.

While certain embodiments have been described, the embodiments have been presented by way of example, and are not intended to limit the scope of the disclosure. The novel embodiments can be implemented in various other forms, and various omissions, substitutions, and modifications can be made without departing from the gist of the disclosure. The embodiments and the modifications thereof are included in the scope and the gist of the exemplary embodiments, and are included in a scope of the exemplary embodiments disclosed in the claims and equivalents thereof.

What is claimed is:

1. An image forming device that forms image data on a medium, the device comprising:

a processor;

a memory, communicatively coupled to the processor, wherein the memory stores processor-executable instructions, which upon execution, cause the processor to:

acquire setting information, the setting information including width information indicating a printable width range in which the image data is formable in a width direction of the medium, and length information indicating a printable length range in which the image data is formable in a length direction of the medium, and switch a formation position of the image data based on the length information corresponding to a type of the medium; and a printer configured to form an image on the medium based on the setting information acquired by the processor, wherein the length information indicates one of a fixed length or a variable length, and when the length information indicates the fixed length, the printer is configured to form the image data such that a center of a length of the image data coincides with a center of the fixed length, and when the length information indicates a variable length, the printer is configured to repeatedly form the image data on the medium in the length direction.

2. The device according to claim 1, wherein the setting information further comprises a proximity interval, and when the length information indicates the variable length, the proximity interval defines a distance between adjacent image data formed on the medium.

3. The device according to claim 1, wherein the setting information further includes scaling information indicating to enlarge or reduce the image data, and when the length information indicates a variable length, the printer determines a length of the image data to be formed on the medium based on each of the width information and the scaling information.

4. The device according to claim 3, wherein the scaling information indicates one of invalid, fitting, or reduction only.

5. The device according to claim 4, wherein when the scaling information indicates invalid, the printer is configured to print the image data without enlarging or reducing the image data.

6. The device according to claim 4, wherein when the scaling information indicates fitting, the image forming device is configured to enlarge or reduce the image data, wherein when the length information indicates the variable length and when an original size of the image data exceeds the printable width range, the image forming device is configured to reduce the image data based on the printable width range, and wherein when the length information indicates the variable length and the original size of the image data is less than the printable width range, the image forming device is configured to enlarge the image data based on the printable width range.

7. The device according to claim 4, wherein when the scaling information indicates fitting, the image forming device is configured to enlarge or reduce the image data, wherein when the length information indicates the fixed length, the image forming device is configured to:

set a reference, the reference being one of the printable length range or the printable width range, and enlarge or reduce the image data based on the reference while maintaining an aspect ratio of the image data.

8. The device according to claim 7, wherein when the printable length range is the reference and the image data is enlarged based on the reference, if a width of the enlarged image data exceeds the printable width range, the image forming device is configured to enlarge the image data based on the printable width range.

9. The device according to claim 1, wherein the length direction is orthogonal to the width direction.

10. A method of forming image data on a medium, the method comprising:

receiving, by a processor, an input by a user comprising width information indicating a printable width range in which the image data is formable in a width direction of the medium, and length information indicating a printable length range in which the image data is formable in a length direction of the medium, wherein the processor is configured to switch a formation position of the image data based on the length information corresponding to a type of the medium;

transmitting, by the processor, setting information including the received width information and the received length information to an image forming device;

acquiring, by a printer, the setting information transmitted from the processor;

forming, by the printer, an image on the medium based on the setting information, determining, by the printer, that the length information indicates a fixed length;

forming the image data such that a center of a length of the image data coincides with a center of the fixed length;

determining, by the printer, that the length information indicates a variable length; and repeatedly forming the image data on the medium in the length direction.

11. The method of claim 10, further comprising:

prior to receiving the input, displaying, by the processor, a print setting screen; and prompting the user to provide the input.

12. The method of claim 10, further comprising:

determining, by the printer, that the length information indicates a fixed length; and determining, based on the setting information, whether to change a scale of the image data.

13. The method of claim 12, further comprising:

in response to determining not to change the scale, printing an original size of the image data based on the setting information;

in response to determining to the change the scale, determining if a scaling condition is met;

in response to the scaling condition being met, scaling the image data; and printing the scaled image data.

14. The method of claim 13, further comprising:

in response to the scaling condition not being met, printing the image data based on an original size of the image data and the setting information.

15. The method of claim 10, wherein the medium is a continuous label sheet.

16. The method of claim 15, further comprising, determining a proximity interval, wherein the proximity interval is a distance between adjacent image data; and minimizing the proximity interval to a minimum distance between adjacent image data.

17. The method of claim 10, further comprising:

determining whether to change a scale of the image data;

in response to determining to change the scale, determine if a scaling condition is satisfied;

in response to the scaling condition being satisfied, determining a length of the image data to be formed on the medium based on each of the width information and the scaling information; and in response to the scaling condition not being satisfied, printing the image data based on an original size of the image data and setting information.

* * * * *